No. 706,447. Patented Aug. 5, 1902.
G. R. PEART.
DOUBLE ACTING SAW.
(Application filed Sept. 9, 1901.)
(No Model.)

re-gulleted again re-gulleted

Witnesses. Inventor.
Rob't F. Drury
E. Dixie Drury. George R. Peart

UNITED STATES PATENT OFFICE.

GEORGE RICHARD PEART, OF SHEFFIELD, ENGLAND, ASSIGNOR OF ONE-HALF TO FRANK FOXON, OF SHEFFIELD, ENGLAND.

DOUBLE-ACTING SAW.

SPECIFICATION forming part of Letters Patent No. 706,447, dated August 5, 1902.

Application filed September 9, 1901. Serial No. 74,816. (No model.)

*To all whom it may concern:*

Be it known that I, GEORGE RICHARD PEART, a subject of the King of Great Britain, and a resident at the Union Saw Mills, Charles street, Sheffield, county of York, England, have invented a certain new and useful Improvement in Double-Acting Saws, (for which I have applied for a patent in Great Britain, No. 8,737, bearing date April 29, 1901,) of which the following is a specification.

The objects of my invention are to avoid clogging the saw-gate with sawdust, to facilitate the resharpening, and to enable such saws to be retoothed by an ordinary mill-hand instead of sending them to a manufacturer or an expert. The resulting advantages are a prolonged working life of the saw, non-heating of the saw, and less power required to drive it.

Figure 1:
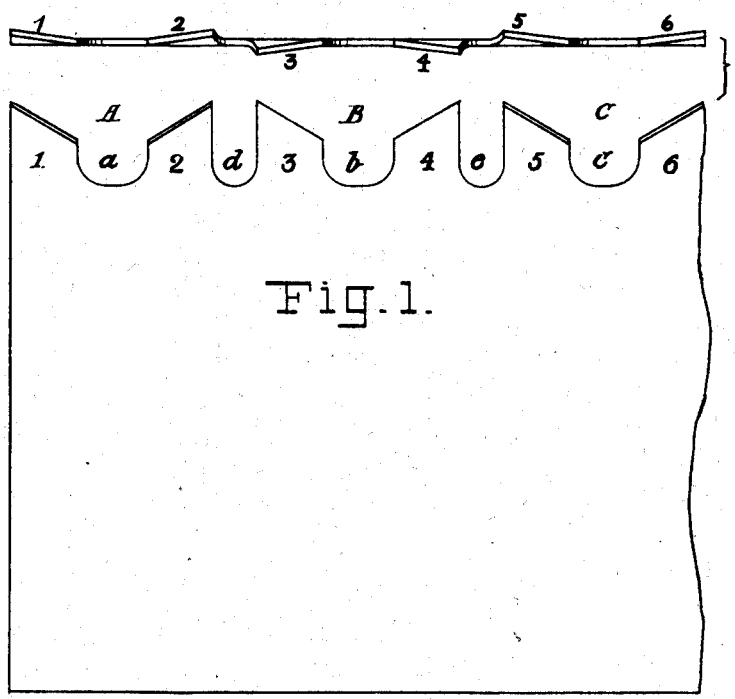
Figure 2:
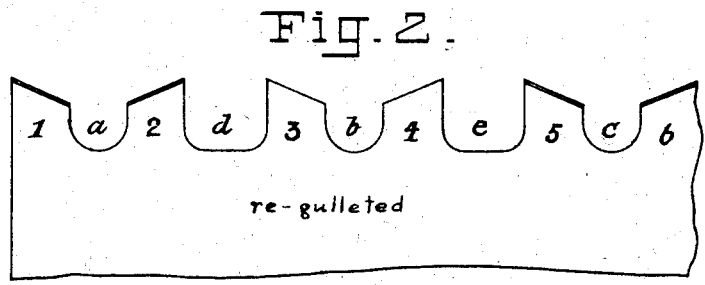
Figure 3:
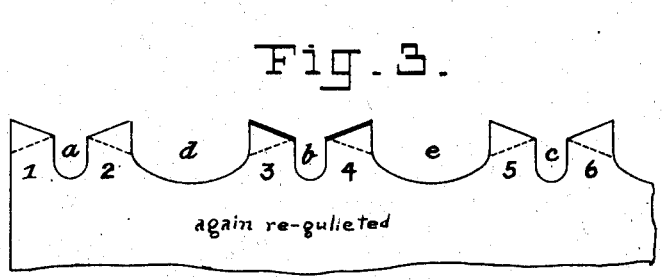

Referring to the drawings which form a part of this specification, Figure 1 represents a piece of a mill-saw with the teeth arranged according to my invention; Fig. 2, the same when partly worn down; Fig. 3, the same when ready to be retoothed.

My invention is applicable to all saws having a double or reciprocating action and required to cut in both directions—such, for example, as mill-webs, gang-saws, crosscut-saws, and the like—and it refers more particularly to the arrangement of the teeth of such saws.

Although I have only shown one form of tooth in the drawings, it must be understood that I do not confine my invention to that particular form.

In carrying my invention into practice, as shown in the drawings, I arrange the teeth in pairs, which I have marked A, B, and C. The two teeth which constitute a pair face in opposite directions, but are "set" to the same side of the saw-blade. Thus the tooth marked 1 faces to the left hand and cuts when the saw moves in the proper direction; the same with 3 and 5 of the other pairs B and C. The next pair of teeth (marked B) are facsimiles of the first-named pair; but they are both set to the opposite side of the saw-blade, and the pair marked C are again reversed in setting to the same side as those of A. Thus each adjacent pair of teeth, with their backs to each other, are set alternately in opposite directions, and this apparently small deviation from the usual practice of construction produces in practice very beneficial results both in the working life of the saw and in a superior finish of cut surface.

When the continual sharpening of the teeth reduces the width of the saw-blade—say, for example, from four and a half inches to three inches—the teeth and spaces or gullets assume the appearance shown in Fig. 2. The gullets $a$, $b$, and $c$ are ground in new proportions—*i. e.*, narrower—while the gullets $d$ and $e$ are ground in new proportions—*i. e.*, wider—from the action of the emery-wheel upon the vertical faces of the teeth 2 and 3 and 4 and 5, as seen in Fig. 2. This grinding or regulleting in new proportions is due to the fact that in order to keep the points of the teeth in the gullets $d$ squared up or sharp it is necessary to grind away the vertical faces, this resulting in widening the gullets. Now if the gullets $a$ were reground of the same width as originally the teeth would be left so narrow as to break off. These gullets $a$ are therefore reground narrower.

When the teeth and gullets assume the configuration shown in Fig. 3, the saw requires retoothing, and this is most economically performed by cutting off the tops of the teeth in the manner indicated by the dotted lines in Fig. 3. This operation causes the teeth 2 and 3 to become a pair, and 4 and 5 also become a pair and are set in the manner before described. By this arrangement of topping the teeth the loss in the width of the saw is not more than one-eighth of an inch.

Having now described my invention, what I claim as new, and desire to secure by Letters Patent, is—

A saw having its teeth arranged in pairs, 1 and 2, 3 and 4 and so on, with gullets $a$, $b$, between the members of each pair and with the gullets $d$, $e$, separating one pair of teeth from the next, the teeth of each pair having their edges converging inwardly toward the bottom of the gullet between them being sharpened from the same side and both set over in the same direction.

In witness whereof I have hereunto set my hand in presence of two witnesses.

GEORGE RICHARD PEART.

Witnesses:
ROBT. F. DRURY,
E. DIXIE DRURY.